United States Patent [19]

Shaw

[11] 4,086,770

[45] May 2, 1978

[54] DUAL CIRCUIT QUICK TAKE-UP MASTER CYLINDER

[75] Inventor: Arthur R. Shaw, Dayton, Ohio

[73] Assignee: General Motors Corporation, Detroit, Mich.

[21] Appl. No.: 745,850

[22] Filed: Nov. 29, 1976

[51] Int. Cl.² .......................................... B60T 11/20
[52] U.S. Cl. ..................................... 60/562; 60/574; 60/588; 60/592
[58] Field of Search ............... 60/562, 574, 576, 578, 60/588, 592, 550, 555

[56] References Cited

U.S. PATENT DOCUMENTS

| | | | |
|---|---|---|---|
| 2,036,342 | 4/1936 | Loweke | 60/576 |
| 2,166,742 | 7/1939 | Lambert | 60/578 |
| 2,317,604 | 4/1943 | Hamilton | 60/576 |
| 2,347,349 | 4/1944 | Humphrey | 60/578 |
| 2,739,448 | 3/1956 | Troy | 60/578 |
| 3,140,587 | 7/1964 | Stelzer | 60/562 |
| 3,143,860 | 8/1964 | Stelzer | 60/562 |
| 3,191,384 | 6/1965 | Krusemark | 60/577 |
| 3,214,913 | 11/1965 | Hayman | 60/577 |
| 4,028,891 | 6/1977 | Belart | 60/574 |

FOREIGN PATENT DOCUMENTS

| | | | |
|---|---|---|---|
| 2,359,307 | 6/1974 | Germany | 60/562 |

*Primary Examiner*—Martin P. Schwadron
*Assistant Examiner*—Abraham Hershkovitz
*Attorney, Agent, or Firm*—D. D. McGraw

[57] ABSTRACT

A master cylinder of the dual pressurizing chamber type for pressurizing brake fluid in separate brake actuating circuits has the primary piston reciprocably mounted in a stepped bore so that the piston rear land moves within a larger bore section than does the piston front land. The secondary piston moves in the same bore section as does the primary piston front land, and has a pair of spaced lands with oppositely facing lip seals. The front land of the primary piston is also provided with a lip seal. These seals operate to permit the build-up of pressure in the pressurizing chambers located on either side of the secondary piston, while permitting fluid to flow past the seals into the pressurizing chambers when the chambers adjacent the pressurizing chambers are producing a greater pressure than that being produced in the pressurizing chambers. In order to provide for quick takeup, brake fluid under relatively low pressure is moved by high volume displacement in the variable volume chamber between the primary piston lands. This pressure is transmitted past the primary piston front land lip seal into the primary pressurizing chamber. It is also transmitted by appropriate passages to a constant volume chamber between the secondary pressurizing piston lands and therefore past the lip seals, and particularly the lip seal on the forward end of the secondary pressurizing piston, to the pressurizing chambers. The pistons and their forward lip seals are so positioned relative to the pressurizing chamber compensation ports that a predetermined amount of movement of the pistons is required for those lips to close the compensation ports and permit pressure to begin to be generated in the brake circuit pressurizing chambers. During this interval of initial movement, the primary piston, and particularly its larger land, causes a relatively large volume of fluid to be moved at a relatively low pressure. An arrangement is provided to vent the large volume, low pressure chamber and the passages associated therewith to the master cylinder reservoir upon a predetermined build-up in pressure in the primary brake circuit pressurizing chamber, thus obviating the need to move fluid by the larger primary piston land once the quick take-up action has been completed.

2 Claims, 1 Drawing Figure

U.S. Patent        May 2, 1978        4,086,770
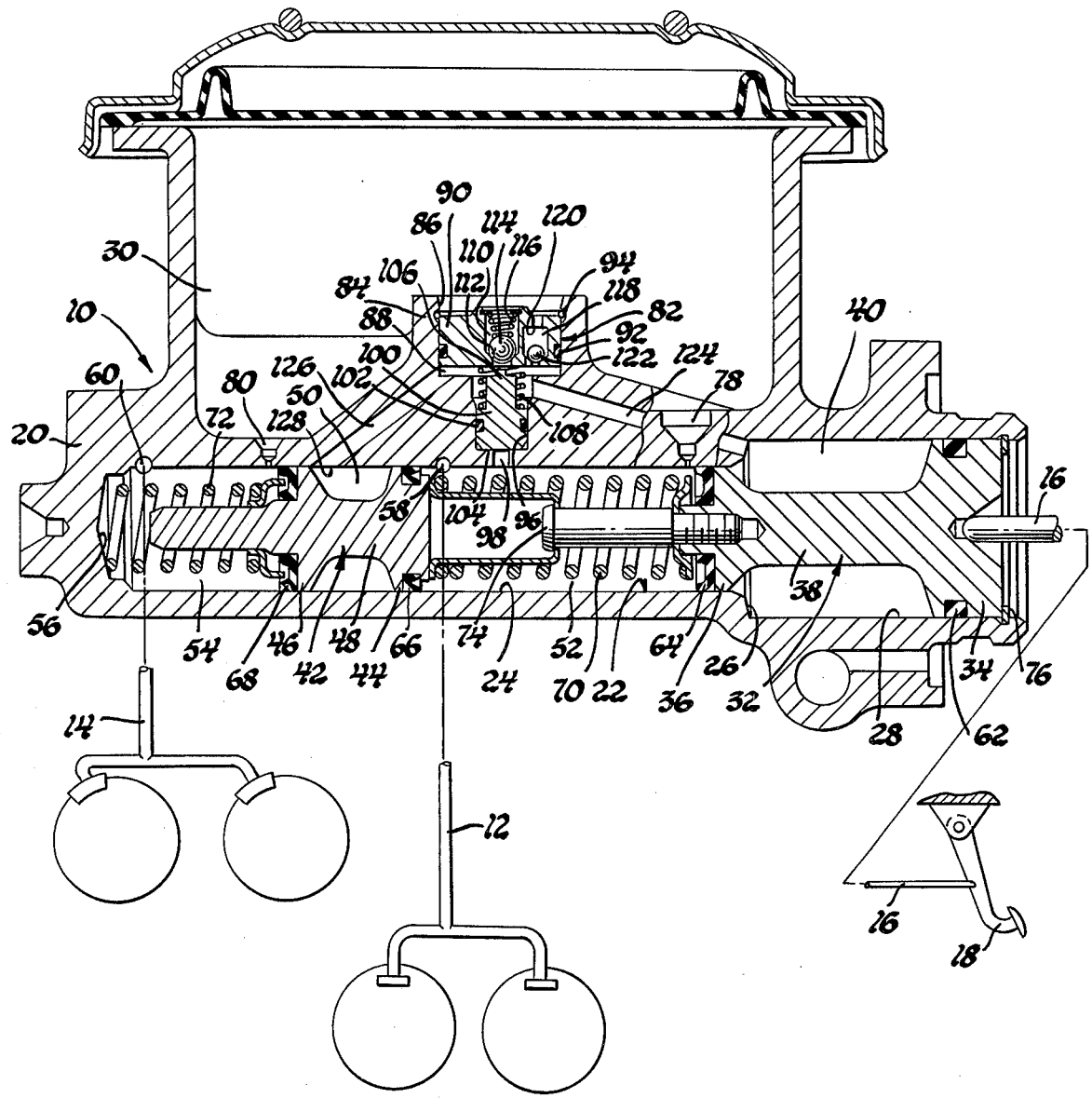

DUAL CIRCUIT QUICK TAKE-UP MASTER CYLINDER

The invention relates to a quick take-up master cylinder, and more particularly to one in which quick take-up is provided by introducing large volumes of brake fluid at relatively low pressure into each of the master cylinder pressurizing chambers for each of the brake circuits pressurized for brake actuation. More particularly, the invention relates to a dual circuit quick take-up master cylinder having a brake fluid reservoir, a quick take-up brake fluid pressurizing chamber having a high rate of volume decrease and a low rate of pressure increase upon initial master cylinder actuation, second and third pressurizing chambers having a low rate of volume decrease and a high rate of pressure increase upon master cylinder actuation and adapted to deliver pressurized brake fluid to separate brake actuating circuits, means fluidly connecting the first pressurizing chamber to the second and third pressurizing chambers upon initial actuation of the master cylinder to provide high volume-low pressure brake fluid to the second and third pressurizing chambers for quick take-up in the separate brake circuits, and means responsive to a predetermined pressure level generated in one of the second and third pressurizing chambers to vent the first pressurizing chamber to the brake fluid reservoir so that actuation of the master cylinder to generate brake actuating pressures in the second and third pressurizing chambers above the predetermined pressure level is not resisted by pressure generated in the first pressurizing chamber. More particularly, this is accomplished by permitting the quick take-up volume brake fluid from the first pressurizing chamber to flow past lip seals leading to the second and third pressurizing chambers until the pressures built up in the second and third pressurizing chambers are each greater than the quick take-up pressure, the lip seals then acting to prevent reverse flow from the second and third pressurizing chambers to the first pressurizing chamber. The first pressurizing chamber is positioned behind the lip seal on the primary piston which pressurizes fluid in the second pressurizing chamber so that quick take-up brake fluid passes directly from the first pressurizing chamber to the second pressurizing chamber past this lip seal during quick take-up action. A passage arrangement leads from the first pressurizing chamber to a constant volume chamber between spaced lands of the secondary piston so that quick take-up fluid is introduced behind the lip seals on the secondary piston, and particularly behind the lip seal for the third pressurizing chamber. The passage means, and therefore the first pressurizing chamber, are vented to the reservoir after a predetermined level of pressure has been generated in the second pressurizing chamber. The passages also act as compensation ports upon quick release of the master cylinder to prevent a sub-atmospheric pressure from existing in the brake circuits, which would tend to permit the introduction of air into the brake circuits if such compensation is not provided.

In the drawing, the single FIGURE is a cross-section view of a master cylinder assembly embodying the invention, with portions of a vehicle brake system being schematically illustrated.

The master cylinder assembly 10 is a dual master cylinder of the quick take-up type, and is illustrated schematically as being installed in a vehicle brake system having separate brake circuits 12 and 14. The master cylinder is schematically illustrated as being actuated by a push rod 16 connected to a brake pedal assembly 18. The assembly 10 includes a body 20 which has a stepped bore 22 formed therein and opening rearwardly. Bore 22 has a forward bore section 24 separated by a shoulder 26 from a larger diameter after bore section 28. The master cylinder body also defines a reservoir chamber 30.

A primary pressurizing piston 32 is provided with a rear land 34, reciprocably received in bore section 28, and a smaller diameter forward land 36 reciprocably received in bore section 24. The piston body 38 joins lands 34 and 36. It can be seen that piston 32 cooperates with bore 22 to define a first variable volume chamber 40, which is the quick take-up chamber.

A secondary pressurizing piston 42 is reciprocably received in bore section 24 forwardly of primary pressurizing piston 32. Piston 42 has a rear land 44 and a forward land 46 joined by the piston body 48. The portion of piston 42 between its lands 44 and 46 cooperates with bore section 24 to provide a constant volume chamber 50.

A primary pressurizing chamber 52 is defined in bore section 24 between pistons 32 and 42, and a secondary pressurizing chamber 54 is defined by the forward end of piston 42 and the closed end 56 of bore section 24. A brake fluid outlet 58 for pressurizing chamber 52 connects to brake circuit 12, and a brake fluid outlet 60 connects pressurizing chamber 54 to brake actuating circuit 14, as is well known in the art. A pressure seal 62 is provided on land 34 of the primary piston to seal the rear end of chamber 40. A lip or V-block seal 64 is mounted on the forward land 36 of piston 32 so that it will permit flow of fluid from chamber 40 to chamber 52 when the pressure in chamber 40 is greater than that in chamber 52, but will prevent reverse flow. Lip or V-block seal 66 is positioned on the secondary piston rear land 44, and lip or V-block seal 68 is positioned on the forward land 46 of that piston. These seals are arranged so that they permit brake fluid to flow past them from chamber 50 to chambers 52 and 54 so long as the pressure in chamber 50 is greater, but will prevent reverse flow when the pressure in chamber 50 is less than that in either of the chambers 52 or 54. Suitable piston return springs 70 and 72 and a well known type of piston positioning mechanism 74 are provided. A piston stop 76 in the rear end of bore 22 provides for a location of the primary and secondary pistons in cooperation with mechanism 74 and the piston return springs when the assembly is in the released position shown.

Compensation ports 78 and 80 are respectively provided in the master cylinder body 20. Port 78 connects reservoir chamber 30 with bore section 24 so that it connects the reservoir chamber with chamber 52 when the master cylinder is in the released position. Port 80 connects reservoir chamber 30 with chamber 54 under similar conditions. As shown, the forward edges of lip seals 64 and 68 are positioned rearwardly of the compensation ports 78 and 80 so as to require a predetermined master cylinder actuating stroke of each of the pistons 32 and 42 before the lip seals close their associated compensation ports.

Compensation control means 82 is provided in a boss 84 of body 20, the boss having a recess 86 opening upwardly to reservoir chamber 30. The bottom end of recess 86 defines a brake fluid chamber 88. A valve housing 90 is mounted in recess 86 so that chamber 88 is below it. Housing 90 has a seal 92 on its outer periphery and seals against the side wall of recess 86. Housing 90 is retained in the recess by retainer ring 94. A piston bore 96 is formed in body 20 to open the brake fluid chamber 88, and has a port 98 connecting it with pressurizing chamber 52. A piston 100, with a peripheral seal 102, is sealingly and reciprocably received in bore 96 so that one end 104 of the piston is exposed to pressure in chamber 52. The other end 106 of the piston has a reduced diameter and extends upwardly into chamber 88. A spring 108 is positioned about piston end 106 and acts on the piston and valve housing 90 to urge the valve housing upwardly against its retainer 94 and the piston 100 downwardly toward engagement with the bottom of piston bore 96. A valve passage 110 is formed in valve housing 90 to provide a valve seal 112. Check valve 114 is received within valve passage 110 and is urged downwardly by valve spring 116 toward engagement with valve seat 112. It can be seen that when piston 100 moves upwardly, the piston end 106 will engage valve 114 and lift the valve off of its seat, providing fluid communication between chamber 88 and reservoir chamber 30 through valve passage 110. When the piston 100 is in the position illustrated in the drawing, valve 114 is seated on its seat 112 so long as pressure in chamber 88 does not exceed that which will open the valve against the force of spring 116. With the valve so closed, brake fluid in reservoir chamber 30 cannot communicate with chamber 88 through valve passage 110.

Another valve passage 118 is also formed through valve housing 90 to connect chamber 88 and reservoir chamber 30. The upper end of passage 118 provides a valve seat 120, and the lower end is arranged to contain valve 122. After valve 122 has been inserted in passage 118 during assembly, the opening of passage 118 into chamber 88 is staked to prevent valve 122 from coming out of passage 118. Valve 122 is smaller in diameter than the main portion of passage 118, but is sufficiently large to seat on valve seat 120 and close the passage. A passage 124 in master cylinder body 20 provides fluid communication between chamber 40 and chamber 88, one end of passage 124 preferably opening through shoulder 26. Another passage 126, also formed in master cylinder body 20, provides fluid communication between chamber 88 and the constant volume chamber 50, the end 128 of passage 126 opening into bore section 24 in such a position that it is always positioned between the secondary pressurizing piston lands 44 and 46.

In normal operation, particularly when wheel brake mechanisms are utilized requiring relatively large fluid displacements to be fully actuated, it may be desirable to provide a large volume of fluid to the brakes at relatively low pressure to take up the initial wheel brake displacement. In disc brakes, for example, such fluid can move the disc brake apply pistons from a retracted position to a position where the brake shoes are placed in contact with the disc. In drum brakes, such an arrangement will permit the wheel cylinders to be expanded to move the brake shoes outwardly against the shoe retracting springs until the brake linings engage the brake drum. In either instance, the volume of fluid required must be generated by brake fluid delivered from the master cylinder assembly. In order to provide for quick take-up with minimum brake pedal movement, the initially required additional fluid volume may be generated in a large volume-changing pressurizing cylinder with relatively little pressure increase. After the take-up action has occurred, the fluid in the brake circuits may then be pressurized by pistons acting in pressurizing chambers which generate pressures at a much higher rate and with relatively much smaller volume decrease. This is the type of operation found in the master cylinder embodying the invention.

Upon initial application of force to the brake pedal 18 by the vehicle operator, push rod 16 moves leftwardly as seen in the drawing to move primary piston 32 leftwardly. The initial portion of this movement will also be transmitted to the secondary piston 42 through caged spring 70. This initial movement moves lip seals 64 and 68 to the point where they barely close compensation ports 78 and 80. During this initial movement, the primary piston land 34 has moved the same distance in bore section 28. It displaces a much larger volume of fluid from chamber 40 for this amount of movement than does the same amount of movement of piston lands 36 and 46 from chambers 52 and 54. Some of the fluid displaced from chamber 40 flows past land 36 and lip seal 64 into pressurizing chamber 52, through outlet 58 and to the brake circuit 12. The remaining fluid displaced through chamber 40 flows through passage 124 to chamber 88. The initial pressure and displaced fluid acts on valve 122 to move it upwardly until it seats or valve seat 120, closing valve passage 118. As additional fluid is displaced from chamber 40, it flows through passage 126 into chamber 50, past land 46 and lip seal 68 into chamber 54, and through outlet 60 into brake circuit 14. Thus quick take-up fluid is provided to both brake circuits 12 and 14 from chamber 40 during initial displacement or piston 32. The fluid flowing through chamber 50 may also flow past land 44 and lip seal 66 into chamber 52. This will be the primary path of quick take-up fluid for brake circuit 12 should lip seal 64 be replaced with a pressure seal similar to seal 62, which seals at all times against flow past it.

Slight additional movement beyond the above first range of movement of pistons 32 and 42 causes lip seals 64 and 68 to respectively close compensation ports 78 and 80. This permits pressures to be generated in chambers 52 and 54 by movements of the forward ends of pistons 32 and 42, the pressure in chamber 52 acting to move piston 42, as is well known in the art. Since the fluid slack in the system has already been taken up, small movements of the pressurizing pistons cause high rates of pressure increase in chambers 52 and 54 for brake application. As soon as the pressures in chambers 52 and 54 become greater than the relatively low pressure in chambers 40 and 50, lip seals 64 and 68 act against the wall of bore section 24 to seal against further brake fluid flow past these lip seals. The pressure generated in pressurizing chamber 52 is exerted through port 98 against the bottom end 104 of piston 100. When this pressure generates sufficient force to compress spring 108, piston 100 moves upwardly to move valve 114 away from valve seat 112. This immediately opens valve passage 110 so that the pressure in chambers 40 and 88, and passages 124 and 126, is vented to reservoir chamber 30. Any additional movement of primary piston 32 merely displaces additional fluid from chamber 40 to reservoir chamber 30 through passage 110, providing no substantial resistance to pressurizing movement of piston 32 insofar as fluid in chamber 40 is concerned.

Upon brake release, the pressurizing chambers 52 and 54 expand in volume as brake fluid is received from brake circuits 12 and 14. At the same time, as chamber 40 also expands in volume, it draws fluid from reservoir chamber 30 through valve passage 118 since there is no pressure acting on valve 122 tending to hold it against its seal 120. In normal operation, lip seals 64 and 68 uncover their compensation ports 78 and 80 so that the brake circuits 12 and 14 are operatively connected to reservoir chamber 30 for compensation purposes. The decrease in pressure in chamber 52 permits piston 100 to be moved downwardly by spring 108, allowing valve 114 to close against its seat 112. However, with valve 122 now open, fluid communication between reservoir chamber 30 and chamber 40 is maintained. If pistons 32 and 42 move in the released direction faster than brake fluid can flow from the brake actuating circuits into chambers 52 and 54, fluid in chambers 40 and 50 can readily move past lands 36, 44 and 46 and their lip seals 64, 66 and 68 to prevent the vacuum in the actuating circuits from allowing air to enter at any point. This fluid is replaced by fluid from reservoir chamber 30 flowing through valve passage 118. Upon completion of the release stroke of the master cylinder, the master cylinder elements are returned to the positions illustrated in the drawing.

What is claimed is:

1. In a master cylinder having a brake fluid reservoir: a first piston defining with a wall of said master cylinder a first pressurizing chamber having a high rate of volume decrease and a low rate of pressure increase upon initial master cylinder actuation; a second and a third piston defining therebetween a second pressurizing chamber and a third pressurizing chamber defined between the third piston and an end wall of said master cylinder, said second and third pressurizing chambers having a low rate of volume decrease and a high rate of pressure increase upon master cylinder actuation and adapted to deliver pressurized brake fluid to separate brake actuating circuits; first means fluidly connecting said first pressurizing chamber to said second pressurizing chamber independently of said third pressurizing chamber when the pressure prevailing in said first pressurizing chamber is greater than the pressure prevailing in said second pressurizing chamber, second means fluid connecting said first pressurizing chamber to said third pressurizing chamber independently of said second pressurizing chamber when the pressure prevailing in said first pressurizing chamber is greater than the pressure prevailing in said third pressurizing chamber to provide high volume-low pressure fluid to said second and third pressurizing chambers from said first pressurizing chamber for quick take-ups in the brake actuating circuits, said first and second means including lip seal means defining parts of said second and third pressurizing chambers and acting to permit fluid flow therepast into each of said second and third pressurizing chambers from said first pressurizing chamber but preventing fluid flow therepast in the reverse fluid flow direction; and means responsive to a predetermined pressure level in one of said second and third pressurizing chambers to vent said first pressurizing chamber to said reservoir so that further actuation of said master cylinder to generate pressure in said second and third pressurizing chambers beyond said predetermined pressure level is not resisted by pressure generated in said first pressurizing chamber after said predetermined pressure level in said one of said second and third pressurizing chambers is attained.

2. In a quick take-up dual pressurizing circuit master cylinder having: a body formed to provide a stepped bore with a larger diameter bore first section and a smaller diameter bore second section with an annular shoulder therebetween, a primary position having a first land reciprocably received in said bore first section and a second land reciprocably received in said bore second section, said piston and said bore between said first and second lands defining a variable volume pressurizing chamber, a pressure seal on said first land, and a lip seal on said second land sealingly engaging said bore and permitting brake fluid flow therepast only from said variable volume pressurizing chamber; a secondary piston having third and fourth axially spaced lands and reciprocably received in said bore second section, said secondary piston including said third land defining with said primary piston and said bore a primary pressurizing chamber, said secondary piston defining with said bore between said third and fourth lands a constant volume chamber, and said secondary piston including said fourth land defining with said bore a secondary pressurizing chamber axially opposite said primary pressurizing chamber; a lip seal on each of said third and fourth lands and actuable to permit brake fluid flow from said constant volume chamber to either or both of said primary and secondary pressurizing chambers while sealing with said bore to prevent reverse brake fluid flow, means for moving said primary and secondary pistons to decrease the volume of said variable volume pressurizing chamber and said pressurizing chambers, the volume of brake fluid displaced from said variable volume pressurizing chamber being greater than the volume of brake fluid being displaced from said pressurizing chambers, and a brake fluid reservoir having fluid compensation control means provided with a brake fluid chamber positioned on the fluidly opposite side of said fluid compensation control means from said reservoir; the improvement comprising; a first passage continuously connecting said variable volume pressurizing chamber with said brake fluid chamber and a second passage continuously connecting said brake fluid chamber with said constant volume chamber and allowing flow in both directions between said constant volume chamber and said brake fluid chamber, master cylinder actuation causing brake fluid to flow from said variable volume pressurizing chamber past said second land lip seal to said primary pressurizing chamber and also to flow through said first passage and said brake fluid chamber and said second passage and said constant volume chamber past said fourth land lip seal to said secondary pressurizing chamber to provide quick take-up, and means responsive to a predetermined pressure in said brake fluid chamber or said primary pressurizing chamber to vent said brake fluid chamber to said reservoir, thereby venting said variable volume pressurizing chamber and said constant volume chamber to said reservoir, further movement of said pistons pressurizing brake fluid in said primary and secondary pressurizing chambers.

* * * * *

UNITED STATES PATENT AND TRADEMARK OFFICE
CERTIFICATE OF CORRECTION

PATENT NO. : 4,086,770
DATED : May 2, 1978
INVENTOR(S) : Arthur R. Shaw

It is certified that error appears in the above-identified patent and that said Letters Patent are hereby corrected as shown below:

Column 3, line 4, "the" should read into;

line 16, "seal" should read seat.

Column 4, line 24, "or" should read on;

line 31, "or" should read of.

Column 5, line 3, "seal 120" should read seat 120.

Column 6, line 8, "position" should read piston.

Signed and Sealed this

Thirty-first Day of October 1978

[SEAL]

Attest:

RUTH C. MASON
Attesting Officer

DONALD W. BANNER
Commissioner of Patents and Trademarks